(12) United States Patent
Anghel et al.

(10) Patent No.: US 12,512,729 B2
(45) Date of Patent: Dec. 30, 2025

(54) RESETTING AN ELECTROMECHANICAL DISCONNECT

(71) Applicant: Honeywell International Inc., Charlotte, NC (US)

(72) Inventors: Cristian E. Anghel, Tucson, AZ (US); David R. Minke, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 402 days.

(21) Appl. No.: 18/161,818

(22) Filed: Jan. 30, 2023

(65) Prior Publication Data
US 2024/0258882 A1  Aug. 1, 2024

(51) Int. Cl.
*H02K 11/00* (2016.01)
*H02K 7/108* (2006.01)
*H02K 7/116* (2006.01)

(52) U.S. Cl.
CPC ......... *H02K 11/0094* (2013.01); *H02K 7/108* (2013.01); *H02K 7/116* (2013.01)

(58) Field of Classification Search
CPC .... H02K 11/0094; H02K 7/108; H02K 7/116; B60K 6/387; F16D 2011/006; F16D 28/00; F16D 11/14; F16H 63/3069; F16H 63/38
See application file for complete search history.

(56) References Cited

U.S. PATENT DOCUMENTS

| | | | |
|---|---|---|---|
| 3,441,116 A | * | 4/1969 | Quenneville ........... F02C 7/275 192/24 |
| 6,834,750 B2 | | 12/2004 | Baker et al. |
| 9,732,804 B2 | * | 8/2017 | Grosskopf ................ F16D 1/02 |
| 10,486,690 B2 | | 11/2019 | Colavincenzo et al. |
| 10,948,054 B2 | | 3/2021 | Fliearman et al. |
| 2008/0115608 A1 | * | 5/2008 | Birdi ....................... F16D 7/044 74/405 |
| 2015/0093946 A1 | * | 4/2015 | Kinoshita ............. B63H 21/21 440/1 |
| 2015/0184745 A1 | * | 7/2015 | Arai ..................... F16H 61/0437 477/107 |

(Continued)

FOREIGN PATENT DOCUMENTS

| | | |
|---|---|---|
| CN | 107387591 A | 11/2017 |
| DE | 102020212195 A1 | 3/2022 |

(Continued)

OTHER PUBLICATIONS

European Patent Office, "Extended European Search Report", dated May 15, 2024, from EP Application No. 24150532.0, from Foreign Counterpart to U.S. Appl. No. 18/161,818, pp. 1 through 9, Published: EP.

*Primary Examiner* — Farhana Pervin
(74) *Attorney, Agent, or Firm* — Fogg & Powers LLC

(57) ABSTRACT

A method to reset an electromechanical disconnect is provided. The method includes electrically disengaging a pawl holding a first half of a dog clutch, located between a starter-generator and a main engine gear box, in a disengaged position, controllably energizing the starter-generator to produce a selected angle of rotational motion of a starter-generator shaft, wherein the selected angle is equal to 360 degrees divided by a number of teeth on the first half of the dog clutch, and determining when the first half of the dog clutch is engaged with a second half of the dog clutch.

20 Claims, 9 Drawing Sheets

(56) References Cited

U.S. PATENT DOCUMENTS

| | | | |
|---|---|---|---|
| 2017/0058964 A1* | 3/2017 | Schimpf | B21D 53/28 |
| 2019/0186289 A1 | 6/2019 | Dhabade et al. | |
| 2020/0028388 A1* | 1/2020 | Piech | H02K 1/145 |
| 2022/0136594 A1* | 5/2022 | Holmes | F16D 47/04 |
| | | | 192/69.42 |

FOREIGN PATENT DOCUMENTS

| | | |
|---|---|---|
| FR | 2800527 A1 | 5/2001 |
| GB | 1145950 A | 3/1969 |

\* cited by examiner

RESETTING AN ELECTROMECHANICAL DISCONNECT

BACKGROUND

During the last two decades there has been an increased demand for electrification in aerospace and other vehicles. Traditionally, aircraft engines have been started using compressed air or a DC starter. With the advent of More Electric Aircraft (MEA), the engine is started by using an AC generator already installed on the engine as a starter by employing power converters. During Engine Start Mode, the AC generator installed on the engine is operated as a motor and is fed from a variable voltage and variable frequency power source provided by the power converters. Once the engine attains a certain speed, the power converter is disconnected and the system transitions to power generation mode. What was previously named "generator" is now known as a "starter-generator" (SG).

The SG is coupled with the engine typically via an accessory main engine gearbox (MEG). Besides the SG, this MEG drives other aircraft critical systems. Thus, the MEG needs to be protected in the event of failure in the SG. One approach to protect the MEG is to include a simple sheer section on a shaft between the SG and the MEG. However, because the SG usually operates in a 2:1 speed range, protection of the MEG cannot be reliably accommodated with a simple sheer section on the shaft. Therefore, another conventional approach to protect the MEG is to use a resettable electromechanical disconnect. Conventionally, resetting (or reengaging) the resettable electromechanical disconnect is performed when the engine is off. However, the engaging mechanism (which is typically a dog clutch that has high and low point features) needs to be properly aligned to achieve re-engagement. This alignment is completed by an operator physically accessing and rotating the SG shaft or rotor until alignment of the dog clutch is achieved. As a result, the production and operation cost of operating the resettable electromechanical disconnect are increased.

SUMMARY

A method to reset an electromechanical disconnect is provided. The method includes electrically disengaging a pawl holding a first half of a dog clutch, located between a starter-generator and a main engine gear box, in a disengaged position, controllably energizing the starter-generator to produce a selected angle of rotational motion of a starter-generator shaft, wherein the selected angle is equal to 360 degrees divided by a number of teeth on the first half of the dog clutch, and determining when the first half of the dog clutch is engaged with a second half of the dog clutch.

BRIEF DESCRIPTION OF THE DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention enable resetting of an electromechanical disconnect between an electric generator and a main engine of a vehicle. Embodiments of this invention differ from existing electromechanical disconnects by reengaging the link between the generator and the main engine through a signal from an electronic control system. Thus, the electric generator is enabled to be reengaged with the main engine without manual intervention or action on the part of a technician. To accomplish this, embodiments of the present invention use an existing generator on the vehicle, such as the starter-generator (SG) system to reset the mechanical interface rather than a dedicated mechanism and operator local intervention.

Advantageously, embodiments of the present invention eliminate the undesired weight, size and cost penalty added by the features used to perform a manually operated reset in existing systems. Further, the time required to reset the interconnection between the generator and the main engine is reduced. Further, the operation of resetting the link is also simplified as explained in more detailed below.

Figure 1:
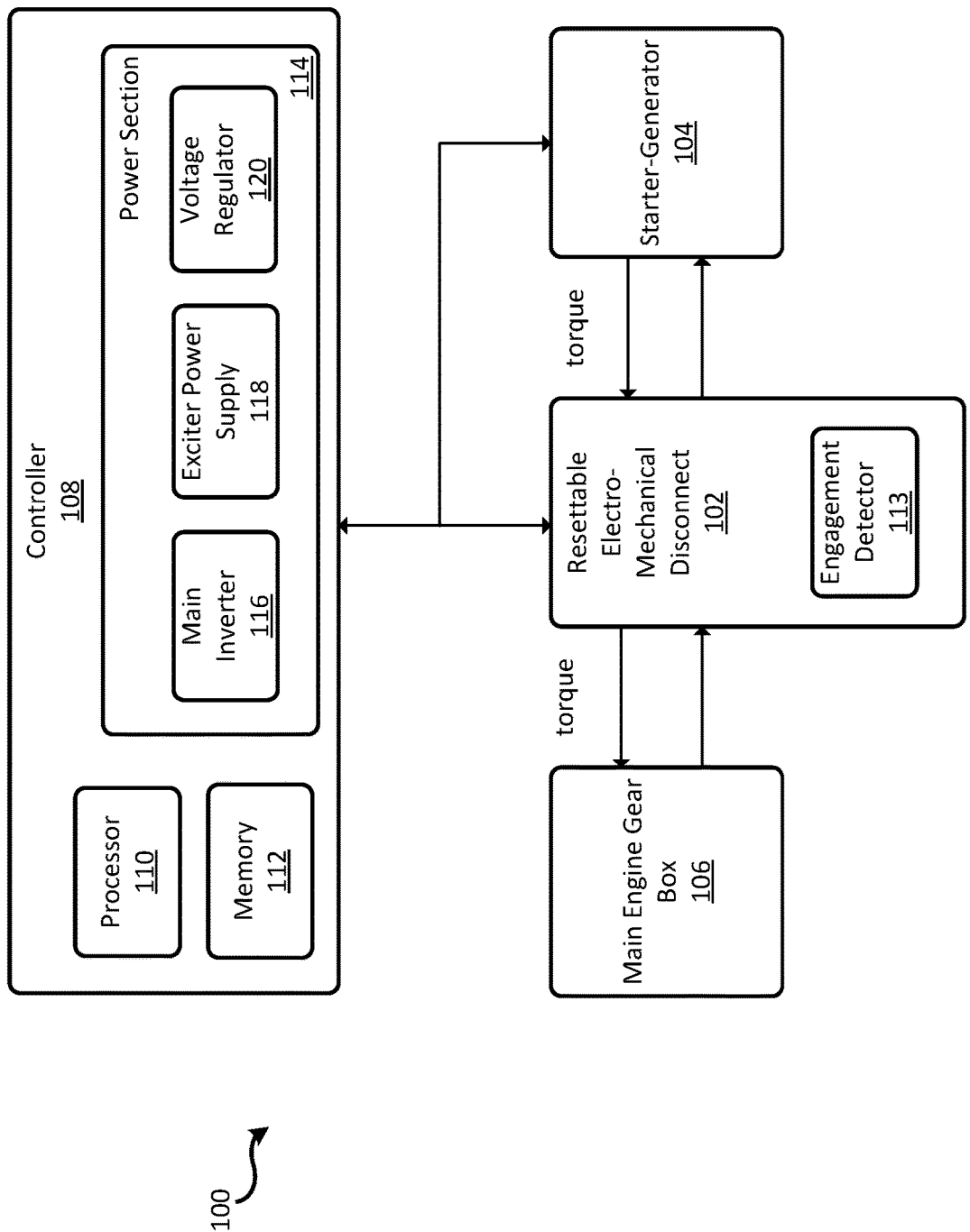
FIG. 1 is a block diagram of one embodiment of a system including a resettable electromechanical disconnect coupled between a starter-generator and a main engine gear box.

FIG. 1 is a block diagram of one embodiment of a system, indicated generally at 100, including a resettable electromechanical disconnect 102 coupled between a starter-generator 104 and a main engine gear box 106. It is noted that this embodiment of the invention is described in the context of a system on an aircraft. However, the teachings of the present invention are not limited to use with aircraft. Use with other types of vehicles, e.g., cars, trucks, buses, other land-based vehicles as well as all kinds of watercraft, is also contemplated.

Starter-generator 104 has a dual function on the vehicle. First, starter-generator 104 is used to start a main engine of the vehicle. Additionally, once the main engine is started, the starter-generator 104 is used to generate electric power for various systems on the vehicle during operation of the vehicle. Resettable electromechanical disconnect 102 is interposed between main engine gear box 106 and starter-generator 104 to enable disconnection of the starter-generator 104 from the main engine gear box 106 (and the main engine) to prevent damage to the starter-generator 104, main engine gear box 106 or the engine.

Embodiments of the present invention enable the disconnect to be re-connected through an electromechanical system described herein. During normal operation (in an engaged state as discussed in more detail below) the resettable electromechanical disconnect 102 is designed to rotate at a speed controlled either by the main engine (during normal operation) or the starter generator (during start-up). In both instances, the resettable electromechanical disconnect 102 transmits a load (torque) over the mechanical interface between the resettable electromechanical disconnect 102 and the starter-generator 104 and the main engine gear box 106. In some embodiments, resettable electromechanical disconnect 102 includes a dog clutch as the mechanism to provide the resettable connection between the main engine gear box 106 and the starter-generator 104. In other embodiments, other mechanisms are used that enable connection and disconnection of the main engine gear box 106 and the starter-generator 104. An embodiment using a dog clutch is described in more detail below.

Starter-generator 104 is controlled by signals from controller 108 (e.g., a starter-generator control unit (SGCU) on an aircraft). Controller 108 includes a processor 110 and a memory 112. Controller 108 also includes power section 114 which outputs a controlled high current that will produce torque in the starter-generator 104 as described in more detail below. Power section 114 includes three power sections: main inverter 116 that is configured to supply a high current to a main stator of the starter-generator 104, exciter power supply 118 that is configured to supply alternating current (AC) excitation at a lower current and voltage regulator 120 that is configured to supply lower direct current (DC) when starter-generator 104 operates in a generate mode. Main inverter 116 and exciter power supply 118 are used during start mode for starter-generator 104. Memory 112 is loaded with instructions, which, when run on the processor 110 cause the processor 110 to send control signals to the power section 114 of starter-generator controller 108 to supply controlled power (e.g., current and voltage) to the starter-generator 104 and the resettable electromechanical disconnect 102.

Figure 2:
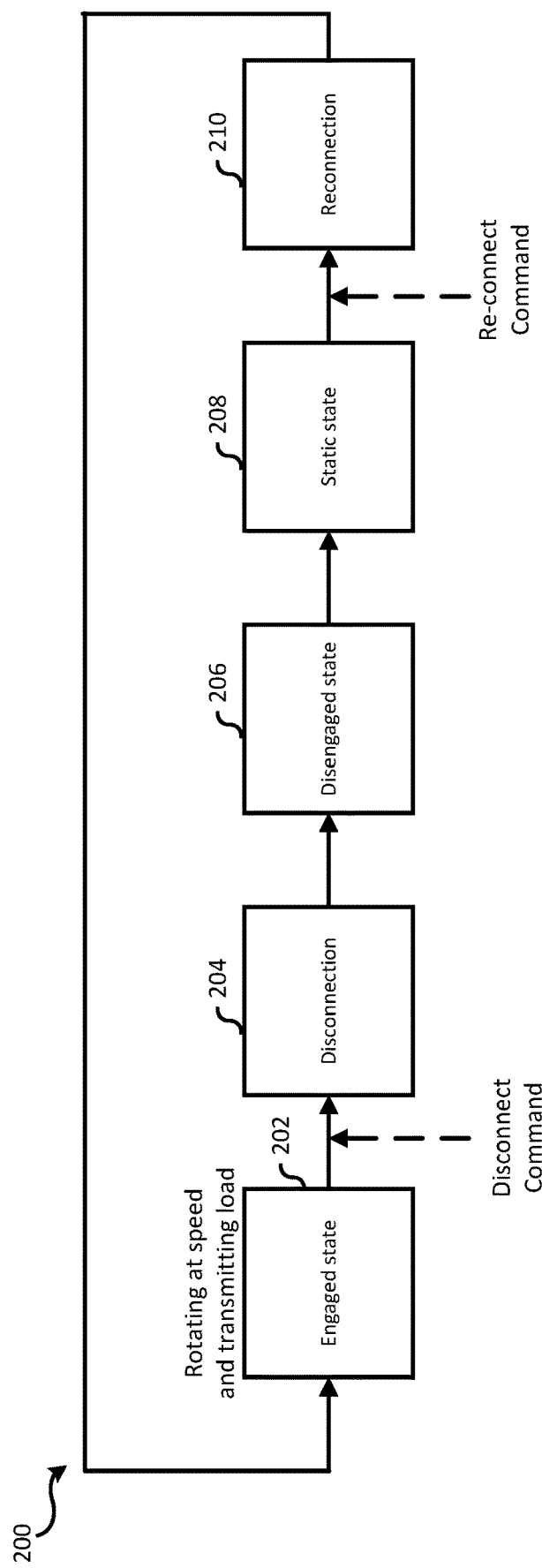
FIG. 2 is one embodiment of a state transition diagram for the system of FIG. 1.

FIG. 2 is one embodiment of a state diagram, indicated generally at 200, for the system of FIG. 1. The operation of system 100 will be described in conjunction with the state diagram 200.

In operation, system 100 begins in an engaged state (202). In this state, the electromechanical disconnect 102 is engaged such that electromechanical disconnect 102 rotates at speed and transmits a load (torque) between starter-generator 104 and main engine gear box 106. When processor 110 of controller 108 issues a disconnect command to resettable electromechanical disconnect 102, system 100 mechanically disconnects the starter-generator 104 from the main engine gear box 106 in the disconnection state (204). In this state, torque transmission ceases between the main engine gear box 106 and the starter-generator 104. In some embodiments, the disconnect command causes a solenoid-activated pawl in the resettable electromechanical disconnect 102 to move to engage with a first half of a dog clutch to cause the first half of the dog clutch to disengage from the second half of the dog clutch. System 100 thus enters the disengaged state (206). It is noted that in the disengaged state, the main engine gear box 106 can still rotate during operation of the main engine. Prior to reconnection of the starter-generator 104 with the main engine gear box 106, the engine is turned off and the main engine gear box 106 ceases to rotate. Thus, system 100 enters static state 208.

When it is desired to reengage the starter-generator 104 and the main engine gear box 106, controller 108, executing instructions from memory 112 by processor 110, issues a command to starter-generator 104 and resettable electromechanical disconnect 102 to reengage. Based on these commands, system 100 enters the reconnection state (210). In this state, in one embodiment, the resettable mechanical disconnect 102 moves the solenoid-activated pawl holding the first and second halves of the dog clutch apart such that the first and second halves of the dog clutch move into contact with each other. Because the teeth of the first and second halves of the dog clutch may not be aligned, starter-generator 104 is controllably energized through a controlled high current that enables the teeth of the first half of the dog clutch to be rotated slowly and over a limited angle of rotation until they mesh with the teeth of the second half of the dog clutch. Starter-generator 104 receives the controlled current from main inverter 116 and the exciter power supply 118 in the power section 114 under control of processor 110 of controller 108 to operate in a modified version of its start mode to accomplish this meshing of the teeth of the dog clutch.

Figure 3:
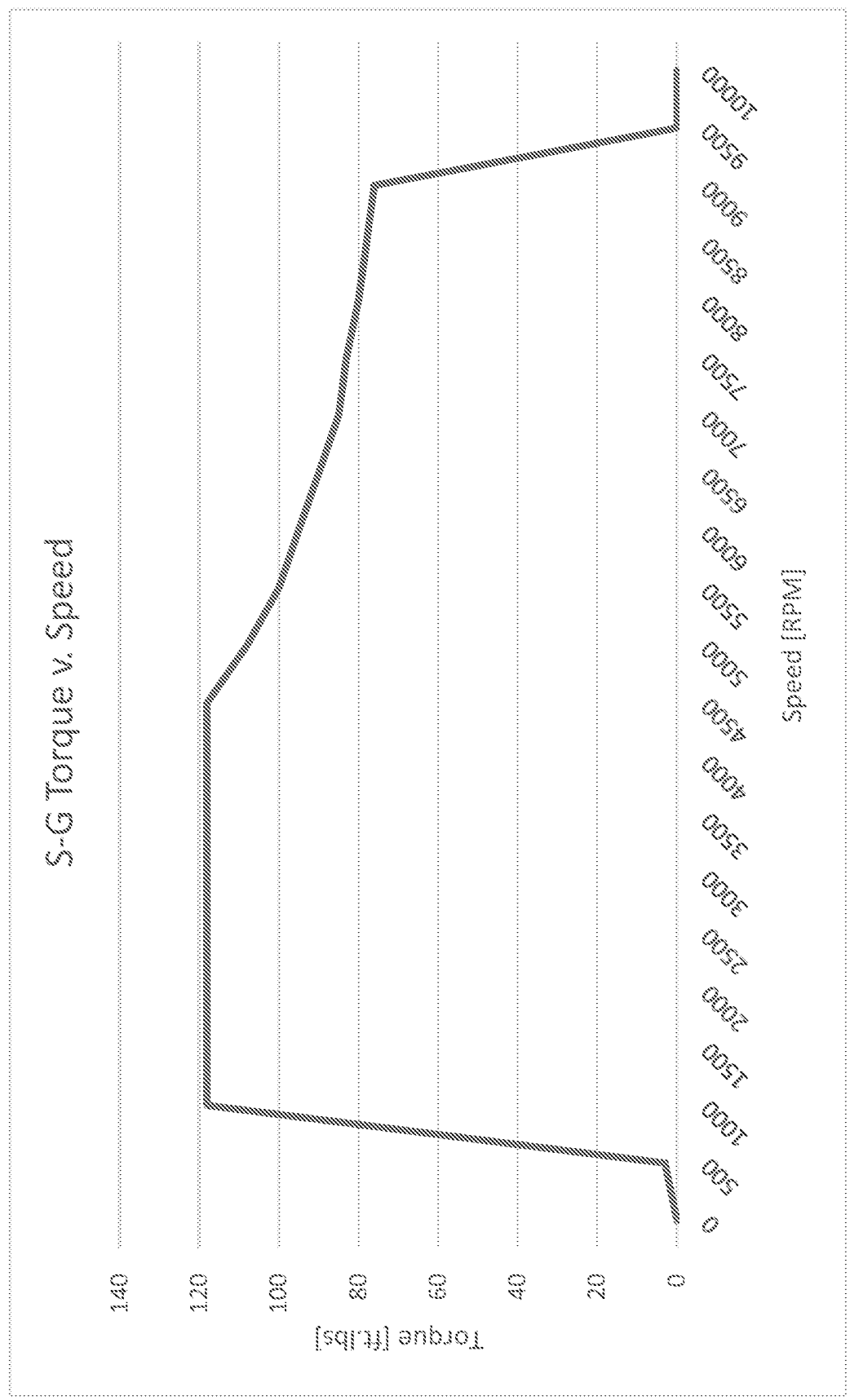
FIG. 3 is a graph that illustrates one embodiment of a relationship between torque and speed of the starter-generator of FIG. 1 that enables re-engaging the resettable electromechanical disconnect.

In this modified start mode, the starter-generator 104 turns electrical energy from power section 114 of controller 108 into mechanical power or torque. In one embodiment, a start current profile with a ramp of zero to 5 percent of the rated current needed to start the main engine is applied by main inverter 116 of power section 114 for 1 to 2 seconds to the starter-generator 104 while the current from exciter power supply 118 is kept constant during and after this time period. An example of a power profile for starter-generator (SG) 104 is provided in FIG. 3. At low speed (from 0 to 500 RPM), the power profile from power section 114 operates at a level that provides a torque that is significantly below the torque provided at higher speeds. This causes a shaft of the starter-generator 104 to rotate slowly and at low power. As the shaft of the starter-generator 104 begins to rotate (apply torque), at low speed and over a controlled angle, the teeth of the first and second halves of the dog clutch are able to move into a meshed position, thereby fully engaging the dog clutch. In one embodiment, resettable electromechanical disconnect 102 of system 100 includes an engagement detector 113 that is configured to determine when the first half of the dog clutch is engaged with the second half of the dog clutch. For example, in one embodiment, the engagement detector 113 includes a proximity sensor such as a capacitive or inductive proximity sensor as described in more detail below with respect to FIGS. 5 to 7.

Once the resettable electromechanical disconnect 102 is engaged as detected by controller 108, starter-generator 104 can continue with its normal start up power profile and system 100 enters the engaged state (202). Advantageously, the capability of the starter-generator 104 to produce precisely controlled torque enables performing the reset electronically rather than requiring a physical intervention from an operator to manually perform a mechanical alignment.

Figure 4:
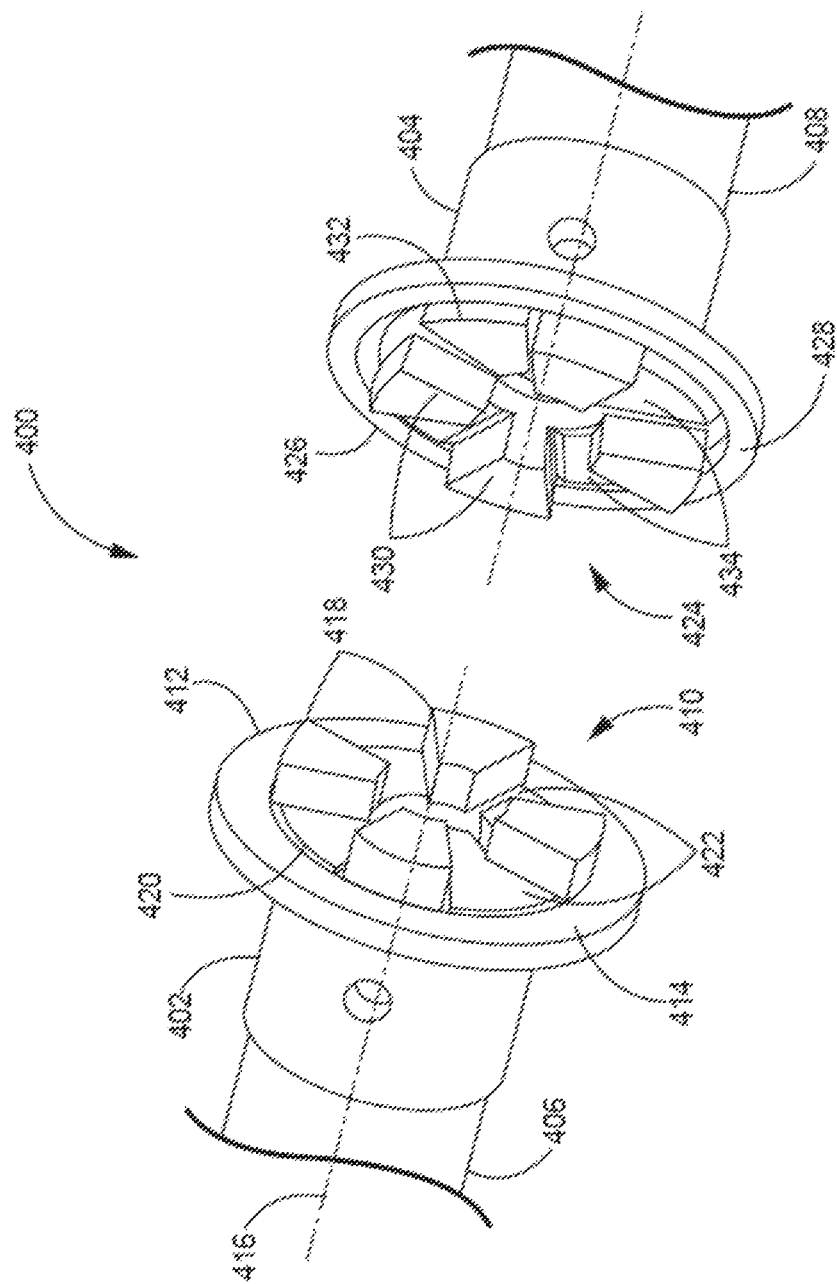
FIG. 4 is a perspective view of one embodiment of a dog clutch for use in one embodiment of the resettable electromechanical disconnect of FIG. 1.

FIG. 4 is a perspective, exploded view of certain aspects of one embodiment of a dog clutch, indicated generally at 400, for use in one embodiment of the resettable electromechanical disconnect 102 of FIG. 1. In this embodiment, dog clutch 400 includes two halves: first half 402 and second half 404. First half 402 of dog clutch 400 includes a shaft 406 that is operatively coupled to the main engine gear box 106. Further, second half 404 of dog clutch 400 includes a shaft 408 that is operatively coupled to starter-generator 104. It is noted that FIG. 4 shows a simplified view of dog clutch 400 with some features omitted to allow for clear illustration and explanation about the interface between first half 402 and second half 404 of dog clutch 400.

Both first half 402 and second half 404 of dog clutch 400 include an interface for engaging with the other of the first half 402 and second half 404 of dog clutch 400. For first half 402 of dog clutch 400, the interface 410 includes disk 412 positioned on an end of shaft 406 and with an interface surface 414 that is orthogonal to a rotational axis 416. Further, interface 410 includes a plurality of teeth 418 that are equally spaced apart within a circular region 420 on interface surface 414. Each pair of teeth 418 is separated by an opening 422 configured to receive a tooth of second half 404 of dog clutch 400 when first half 402 and second half 404 are engaged. Second half 404 of dog clutch 400 is similarly constructed with interface 424, disk 426, interface surface 428, teeth 430, circular region 432 and openings 434. In the embodiment shown in FIG. 4, first half 402 and second half 404 each include 4 teeth. It is understood that the number of teeth shown is exemplary and that other appropriate numbers of teeth may be used on first half 402 and second half 404 of dog clutch 400 based on the specific implementation of the dog clutch.

Figure 5:
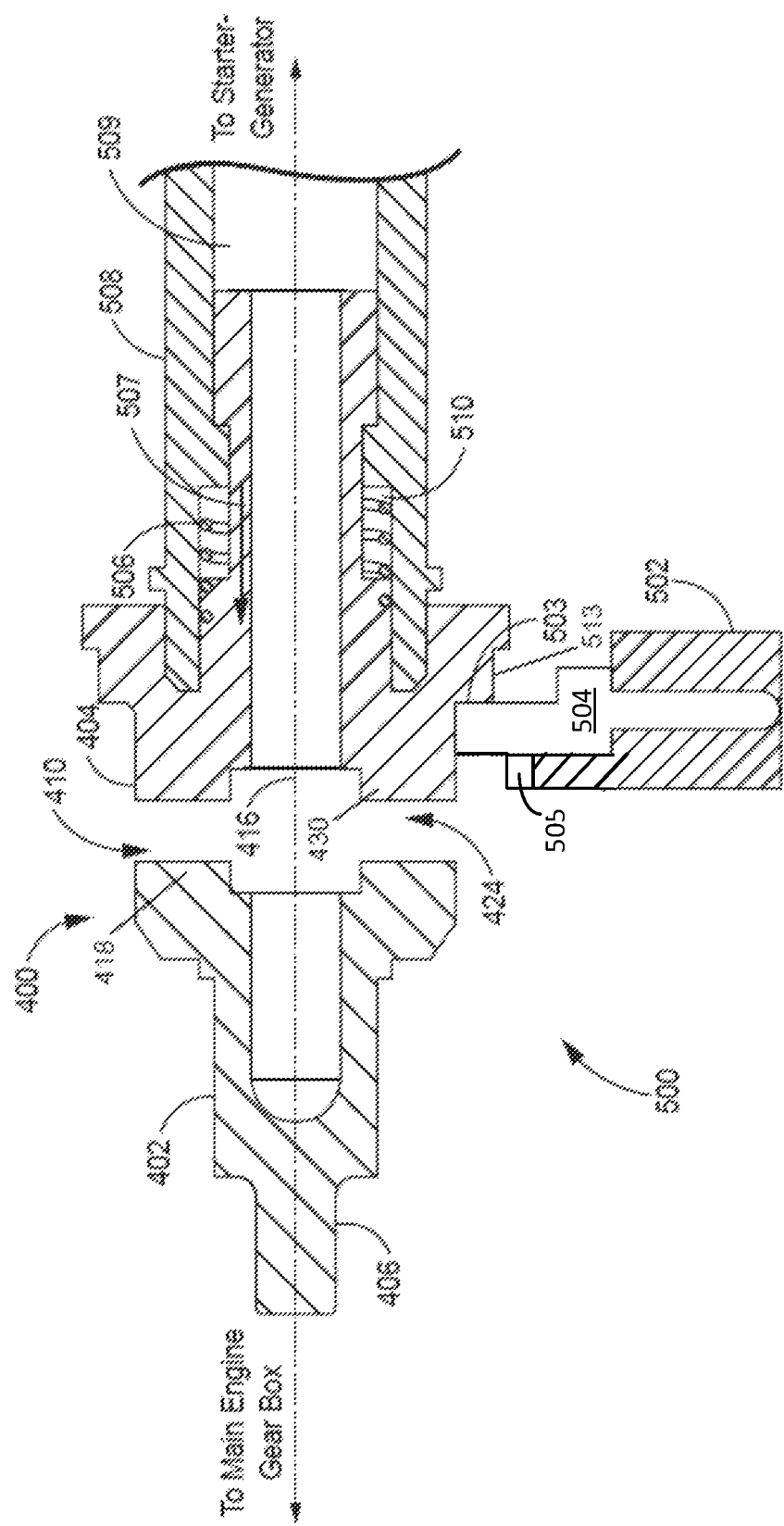
FIGS. 5, 6, and 7 are cross sectional views of functional components of one embodiment of a resettable electromechanical disconnect that can be used in the system of FIG. 1.
Figure 6:
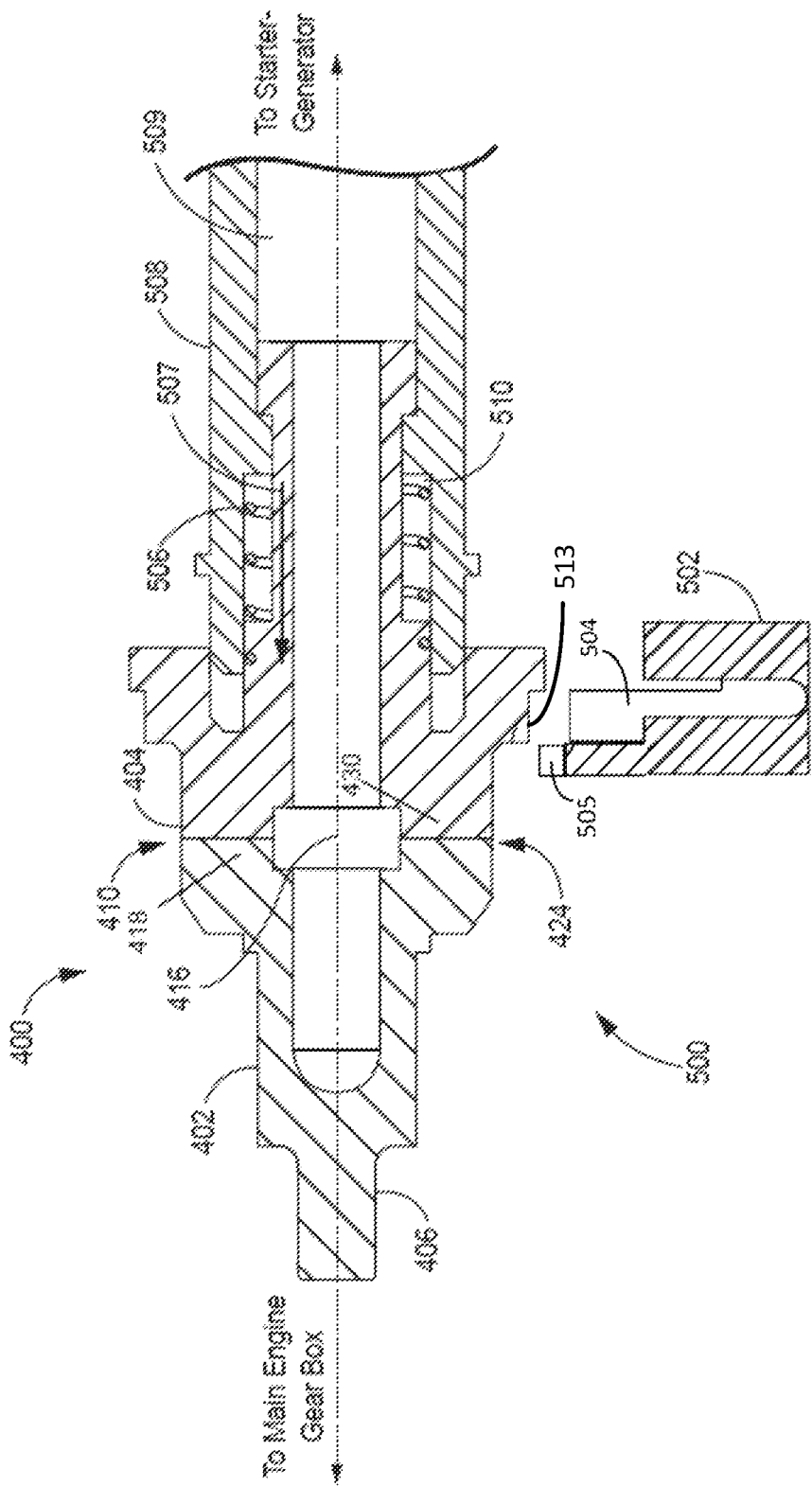
Figure 7:
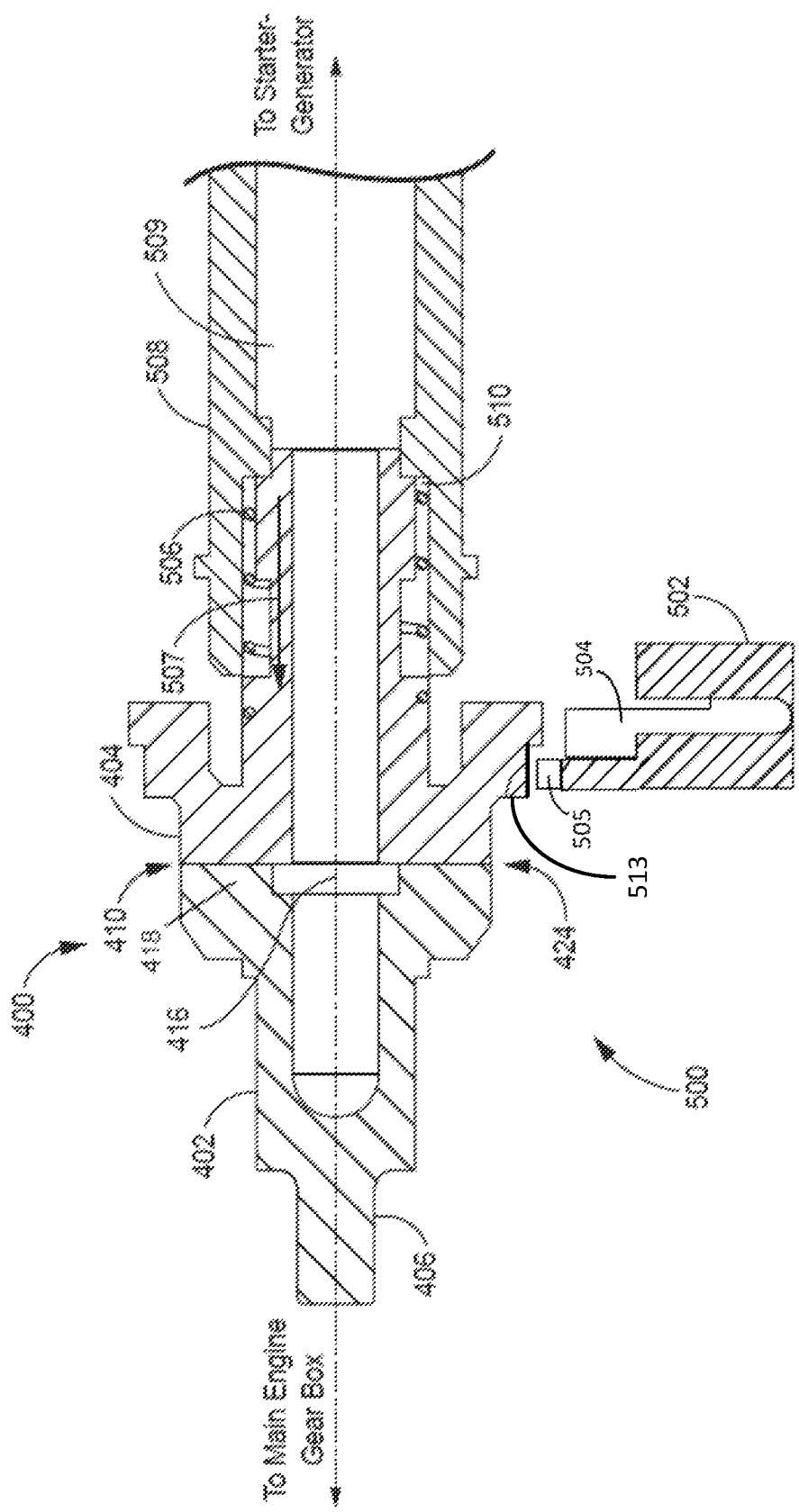

FIGS. 5, 6, and 7 are cross sectional views of functional components of one embodiment of a resettable electromechanical disconnect, indicated generally at 500, that can be used in the system of FIG. 1. Resettable electromechanical disconnect 500 includes dog clutch 400 which enables shaft 508 of a starter-generator to be coupled to and decoupled from a shaft 406 that is coupled to a main engine gear box. As described above, dog clutch 400 includes first half 402 and second half 404. First half 402 is coupled to shaft 406 such that first half 402 of dog clutch 400 does not translate along the rotational axis 416. In contrast, second half 404 of dog clutch 400 is enabled to translate along rotational axis 416. This translation of second half 404 of dog clutch 400 enables resettable electromechanical disconnect 500 to connect and disconnect shaft 406 with shaft 508. It is noted that shaft 508 includes a spline coupling in region 510 (not shown) with second half 404 of dog clutch 400 to enable transmission of torque as well as translation of second half 404 of dog clutch 400 along rotational axis 416.

Second half 404 of dog clutch 400 is biased to translate along rotational axis 416 toward first half 402 of dog clutch 400 by use of spring 506 which applies pressure to second half 404 of dog clutch 400 in the direction of arrow 507. Second half 404 of dog clutch 400 is disposed in a channel 509 of shaft 508. When in the disengaged state (206), pawl 504 engages with spiral groove 503 on second half 404 of dog clutch 400. Pawl 504 thus holds second half 404 of dog clutch 400 in the disengaged position such that interface 410 of first half 402 of dog clutch 400 is separated from interface 424 of second half 404 of dog clutch 400.

Resettable electromechanical disconnect 500 enters reconnection state (210) when a reset signal is received from the controller. The signal causes solenoid 502 to move pawl 504 out of spiral groove 503 as shown in FIG. 6. With pawl 504 in this position, second half 404 of dog clutch 400 is forced into contact with interface 410 of first half 402 of dog clutch 400. As shown in this cross section, teeth 418 of first half 402 of dog clutch 400 are in contact with teeth 430 of second half 404 of dog clutch 400. In this position, first half 402 of dog clutch 400 is not fully engaged with second half 404 of dog clutch 400.

To fully engage dog clutch 400, the teeth 418 of first half 402 of dog clutch 400 are moved to be disposed in openings 434 of second half 404 of dog clutch 400. Likewise, teeth 430 of second half 404 of dog clutch 400 are moved to be disposed in openings 422 of first half 402 of dog clutch 400. This state is shown in FIG. 7. This state is achieved by controllably energizing the starter-generator to provide torque on shaft 508 at low speed and over a controllable rotational angle. In one embodiment, shaft 508 is rotated by 360 degrees divided by the number teeth on interface 424. In this case, rotation is limited to 90 degrees. Before shaft 508 reaches this rotational limit, teeth 430 of second half 404 of dog clutch 400 slide into openings 422 of first half 402 of dog clutch 400 under pressure from spring 506. Once the teeth are in the openings, dog clutch 400 is engaged and the resettable electromechanical disconnect 500 can rotate at speed and transmit load.

In other embodiments, the starter-generator is controllably energized in other ways to rotate the shaft 508 to enable meshing of the teeth of the dog clutch. For example, in some embodiments, the starter-generator is controllably energized by providing a start current in short, low bursts to cause the shaft 508 to rotate in small increments. In other embodiments, the starter-generator is controllably energized by applying current at a level to cause the starter-generator shaft to rotate slowly. In yet other embodiments, the starter-generator is controllably energized by pulsing the starter-generator for a period of time at high frequency (e.g., 10-50 Hz) to cause shaft 508 to rotate through a selected angle, e.g., 360 degrees divided by the number of teeth on each half of the dog clutch.

In some embodiments, dog clutch 400 includes an engagement detector to determine when teeth 430 of second half 404 of dog clutch 400 are fully engaged in opening 422 of first half 402 of dog clutch 400. In the embodiment of FIGS. 5 to 7, dog clutch includes an engagement detector that uses a proximity sensor 505 mounted adjacent to pawl 504. In one embodiment, proximity sensor 505 comprises an inductive or capacitive proximity sensor. Proximity sensor 505 is used to determine when the teeth of the first half 402 and the second half 404 of dog clutch 400 are fully engaged. To do this, in one embodiment, proximity sensor 505 is configured to determine when a feature, such as elbow 513, of second half 404 of dog clutch 400 is disposed over proximity sensor 505. It is noted that elbow 513 is not shown in the view of dog clutch 400 in FIG. 4 in order to simplify FIG. 4 to focus on the interface between first half 402 and second half 404 of dog clutch 400. Elbow 513 and other features not shown in FIG. 4 are included in FIGS. 5, 6, and 7 to enable description of the operation of dog clutch 400.

As teeth 430 of second half 404 of dog clutch 400 move into openings 422 of first half 402 of dog clutch 400, second half 404 of dog clutch 400 translates toward first half 402 of dog clutch 400. In the process, the feature of second half 404 of dog clutch 400, e.g., elbow 513, also translates toward first half 402 of dog clutch 400 as shown in FIGS. 6 and 7. When this feature, e.g., elbow 513, is positioned over proximity sensor 505 (FIG. 7), proximity sensor 505 generates a signal that indicates that first half 402 and second half 404 of dog clutch 400 are fully engaged.

To disengage the dog clutch 400, pawl 504 is brought back into contact with spiral groove 503 of second half 404 of dog clutch 400. It is noted that spiral groove 503 is not shown in FIG. 4 to allow simplification of FIG. 4 to focus on the interface between first half 402 and second half 404 of dog clutch 400. As shaft 508 rotates, the orientation of spiral groove 503 in the side of second half 404 of dog clutch 400 causes second half 404 of dog clutch 400 to translate away from first half 402 of dog clutch 400 to return to the position shown in FIG. 5.

Figure 8A:
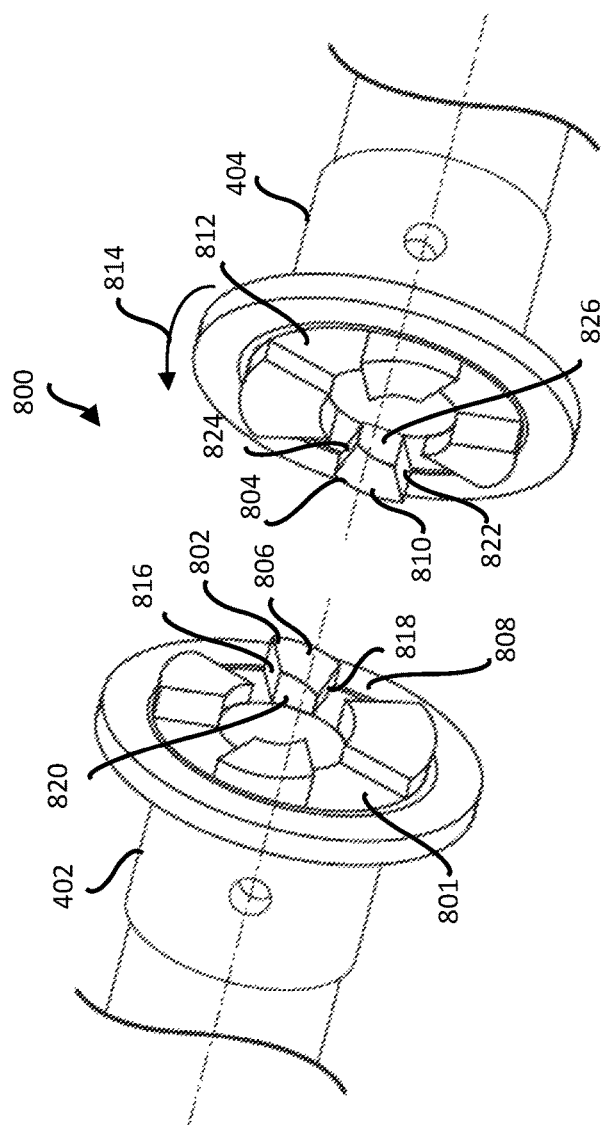
FIG. 8A is a perspective view of an alternative embodiment of a dog clutch with teeth that are configured to promote engagement of the of a first half of the dog clutch with a second half of the dog clutch for use in a resettable electromechanical disconnect.
Figure 8B:
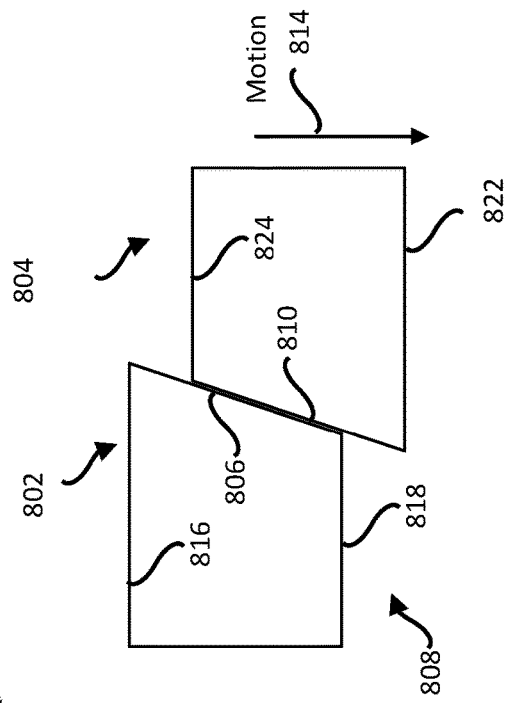
FIG. 8B is a cross sectional view of teeth of the dog clutch of FIG. 8A.

FIGS. 8A and 8B illustrate another embodiment of a dog clutch, indicated generally at 800. Dog clutch 800 is similar to dog clutch 400 of FIG. 4 except that the teeth in dog clutch 800 include a top surface that is angled to promote engagement between first half 402 and second half 404 of dog clutch 800.

First half 402 of dog clutch 800 includes four teeth spaced around surface 801. It is noted that the number of teeth in first half 402 of dog clutch 800 is shown by way of example and not by way of limitation. In other embodiments, the number of teeth in dog clutch 800 may be varied to meet the requirements of a specific implementation. Tooth 802 of first half 402 of dog clutch 800 and tooth 804 of second half 404 of dog clutch 800 are exemplary of the shape of the teeth used to promote engagement between first half 402 and second half 404 of dog clutch 800 in this embodiment.

Tooth 802 includes a top surface 806 that is formed at an angle with respect to surface 801 of first half 402 of dog clutch 800. Similarly, tooth 804 includes a top surface 810 that is formed at an angle with respect to surface 812 of second half 404 of dog clutch 800. The respective angles of top surface 806 and top surface 810 help direct tooth 804 of second half 404 of dog clutch 800 into opening 808 between adjacent teeth of first half 402 of dog clutch 800 when second half 404 of dog clutch 800 is rotated in the direction indicated by arrow 814 while first half 402 of dog clutch 800 remains stationary.

The angle of top surface 806 is established by the relative heights of sides 816 and 818 of tooth 802. In this embodiment, side 816 is taller than side 818 such that top surface 806 slopes downward from side 816 to side 818 toward surface 801. Similarly with respect to tooth 804, side 822 is taller than side 824 such that top surface 810 slopes downward from side 822 to side 824 toward surface 812. Thus, when top surface 810 engages with top surface 806, tooth 804 will move downward toward opening 808 and surface 801 as second half 404 of dog clutch 800 rotates in the direction of arrow 814 and translates toward first half 402 of dog clutch 800. The slope of top surface 806 and the slope of top surface 810 are also shown in the cross section, taken parallel to side 820 of tooth 802 and side 826 of tooth 804 in FIG. 8B.

Figures 9A, 9B:
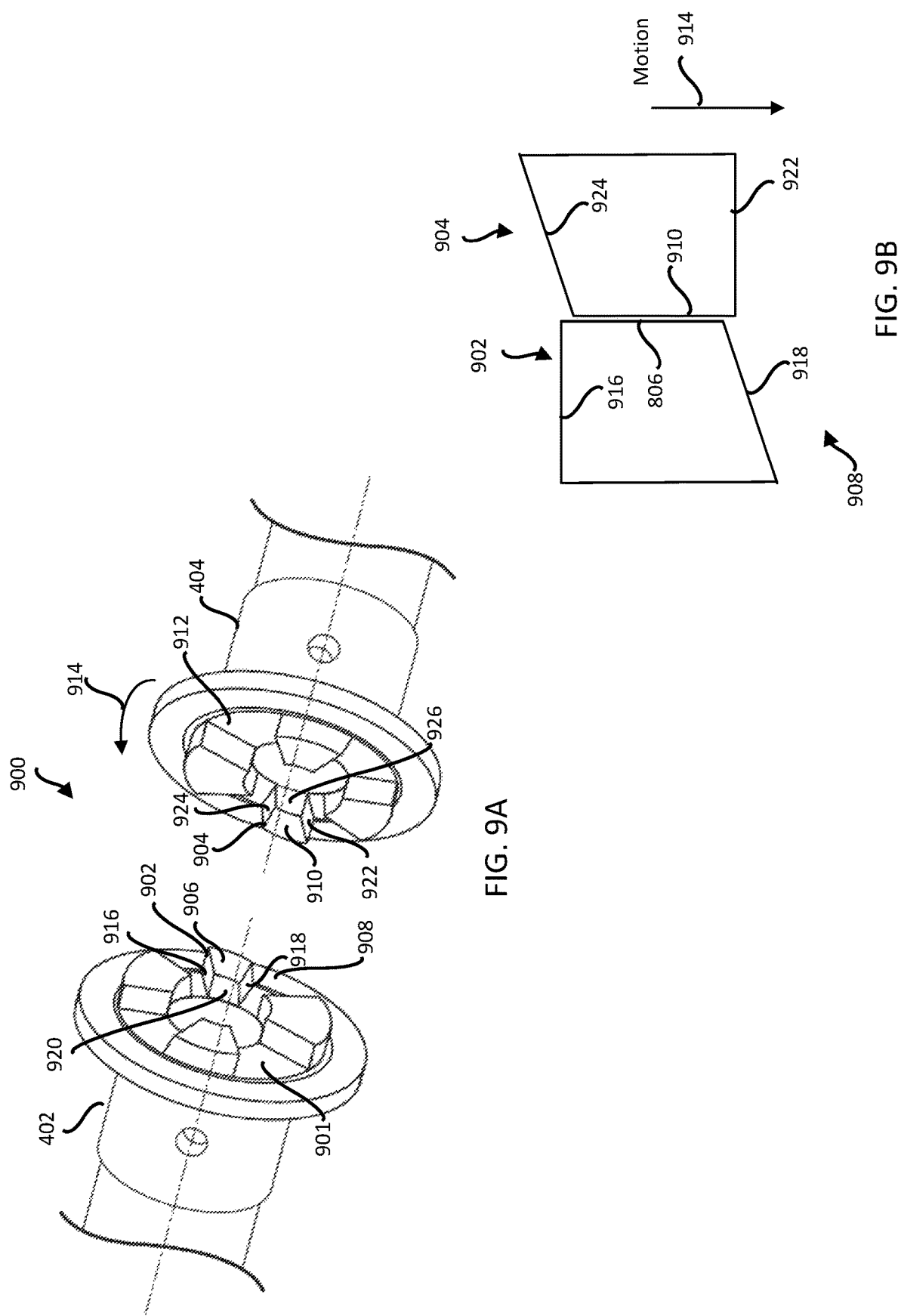
FIG. 9A is a perspective view of another alternative embodiment of a dog clutch with teeth that promote engagement of the first half of the dog clutch with the second half of the dog clutch for use in a resettable electromechanical disconnect.
FIG. 9B is a cross sectional view of teeth of the dog clutch of FIG. 9A.

FIGS. 9A and 9B illustrate another embodiment of a dog clutch, indicated generally at 900. Dog clutch 900 is similar to dog clutch 400 of FIG. 4 and dog clutch 800 of FIG. 8A except that the teeth in dog clutch 900 include a side surface that is angled to promote engagement between a first half 402 and a second half 404 of the dog clutch 900.

First half 402 of dog clutch 900 includes four teeth spaced around surface 901. It is noted that the number of teeth in first half 402 of dog clutch 900 is shown by way of example and not by way of limitation. In other embodiments, the number of teeth in dog clutch 900 may be varied to meet the requirements of a specific implementation. Tooth 902 of first half 402 of dog clutch 900 and tooth 904 of second half 404 of dog clutch 900 are exemplary of the shape of the teeth used to promote engagement between first half 402 and second half 404 of dog clutch 900. Tooth 902 includes a side surface 918 that is formed at an angle with respect to side surface 916. Similarly, tooth 904 includes a side surface 924 that is formed at an angle with respect to side surface 922. The respective angles of side surface 918 and side surface 924 help direct tooth 904 of second half 404 of dog clutch 900 into opening 908 between adjacent teeth of first half 402 of dog clutch 900 when second half 404 of dog clutch 900 is rotated in the direction indicated by arrow 914 while first half 402 of dog clutch 900 remains stationary.

The angle of side surface 918 slopes down toward surface 901 and out from top surface 906 of tooth 902. Similarly with respect to tooth 904, side surface 924 slopes down toward surface 912 and out from top surface 910. Thus, when top surface 910 engages with top surface 906, side surface 924 of tooth 904 of second half 404 is configured to slide down side surface 918 of tooth 902 of first half 402 of dog clutch 900 into opening 908 toward surface 901 as second half 404 of dog clutch 900 rotates in the direction of arrow 914 and translates toward first half 402 of dog clutch 900. The slope of side surface 918 and the slope of side surface 924 are also shown in the cross section, taken parallel to side 920 of tooth 902 and side 926 of tooth 904 in FIG. 9B.

EXAMPLE EMBODIMENTS

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

Example 1 includes a method to reset an electromechanical disconnect. The method includes electrically disengaging a pawl holding a first half of a dog clutch, located between a starter-generator and a main engine gear box, in a disengaged position; controllably energizing the starter-generator to produce a selected angle of rotational motion of a starter-generator shaft, wherein the selected angle is equal to 360 degrees divided by a number of teeth on the first half of the dog clutch; and determining when the first half of the dog clutch is engaged with a second half of the dog clutch.

Example 2 includes the method of example 1, wherein electrically disengaging the pawl comprises sending an electrical signal to a solenoid that moves the pawl to enable translation of the first half of the dog clutch axially toward a second half of the dog clutch.

Example 3 includes the method of any one of examples 1 and 2, wherein controllably energizing the starter-generator comprises providing a start current with a ramp from 0 to 5% for up to two seconds to the starter-generator.

Example 4 includes the method of any of examples 1 through 3, wherein controllably energizing the starter-generator comprises providing a start current in short, low bursts to cause the starter-generator shaft to rotate in small increments.

Example 5 includes the method of any of examples 1 through 4, wherein controllably energizing the starter-generator comprises applying current at a level to cause the starter-generator shaft to rotate slowly.

Example 6 includes the method of any of examples 1 through 5, wherein controllably energizing the starter-generator comprises pulsing the starter-generator for a period of time at high frequency to cause starter-generator shaft to rotate through the selected angle.

Example 7 includes the method of any of examples 1 through 6, wherein the dog clutch has four teeth on the first half of the dog clutch and four teeth on the second half of the dog clutch, and the selected angle of rotational motion is 90 degrees.

Example 8 include a resettable electromechanical disconnect. The resettable electromechanical disconnect including: a dog clutch having a first half and a second half, the first half and second half of the dog clutch oriented along an axis, wherein the first half of the dog clutch is configured to engage with a shaft of a main gear box and the second half of the dog clutch is configured to engage with a drive shaft of a starter-generator; a pawl positioned to move between a first position and a second position, wherein the pawl is disengaged from the dog clutch in the first position and the pawl engages with the second half of the dog clutch in the second position; a solenoid coupled to the pawl; and a control input configured to receive a control signal, wherein the control signal causes the solenoid to move the pawl between the first position and the second position; wherein when the control input receives the control signal to move the pawl to the first position, the pawl disengages with the second half of the dog clutch, the second half of the dog clutch translates toward the first half of the dog clutch and the second half of the dog clutch is controllably rotated through a selected angle by a low torque from the starter-generator until the first half of the dog clutch engages with the second half of the dog clutch, wherein the selected angle is equal to 360 degrees divided by a number of teeth on each half of the dog clutch.

Example 9 includes the resettable electromechanical disconnect of example 8, wherein the second half of the dog clutch includes a spring in a shaft, wherein the spring applies a force on the second half of the dog clutch that causes the second half of the dog clutch to translate toward the first half of the dog clutch when the pawl is in the first position.

Example 10 includes the resettable electromechanical disconnect of any of examples 8 and 9, wherein the first half of the dog clutch and the second half of the dog clutch include a plurality of teeth.

Example 11 includes the resettable electromechanical disconnect of example 10, wherein the teeth of the plurality of teeth are spaced apart to provide an opening between adjacent teeth in the plurality of teeth.

Example 12 includes the resettable electromechanical disconnect of any of examples 10 and 11, wherein a top surface of each tooth of the plurality of teeth of the first half of the dog clutch and the second half of the dog clutch is sloped at an angle to promote movement of the plurality of teeth into a meshed, engaged position.

Example 13 includes the resettable electromechanical disconnect of any of examples 10 through 12, wherein a side of each tooth of the plurality of teeth of the first half of the dog clutch and the second half of the dog clutch is sloped at an angle to promote movement of the plurality of teeth into a meshed, engaged position.

Example 14 includes the resettable electromechanical disconnect of any of examples 8 through 13, and further comprising a proximity sensor that is configured to detect when the first half of the dog clutch engages with the second half of the dog clutch.

Example 15 includes a system. The system includes: a starter-generator; a main engine gear box; a resettable electro-mechanical disconnect coupled between the starter-generator and the main engine gear box; a controller, coupled to the starter-generator and the resettable electro-mechanical disconnect; and the resettable electro-mechanical disconnect including: a dog clutch having a first half and a second half, the first half and second half of the dog clutch oriented along an axis, wherein the first half of the dog clutch is configured to engage with a shaft of the main gear box and the second half of the dog clutch is configured to engage with a drive shaft of the starter-generator; a pawl positioned to move between a first position and a second position, wherein the pawl is disengaged from the dog clutch in the first position and the pawl engages with the second half of the dog clutch in the second position; a solenoid coupled to the pawl; and a control input configured to receive a control signal from the controller, wherein the control signal causes the solenoid to move the pawl between the first position and the second position; wherein when the control input receives the control signal from the controller to move the pawl to the first position, the pawl disengages with the second half of the dog clutch, the second half of the dog clutch translates toward the first half of the dog clutch and the second half of the dog clutch is controllably rotated through a selected angle by a low torque from the starter-generator until the first half of the dog clutch engages with the second half of the dog clutch, wherein the selected angle is equal to 360 degrees divided by a number of teeth of a plurality of teeth on each half of the dog clutch.

Example 16 includes the system of example 15, wherein the second half of the dog clutch includes a spring in a shaft, wherein the spring applies a force on the second half of the dog clutch that causes the second half of the dog clutch to translate toward the first half of the dog clutch when the pawl is in the first position.

Example 17 includes the system of example 16, wherein the teeth of the plurality of teeth are spaced apart to provide an opening between adjacent teeth in the plurality of teeth.

Example 18 includes the system of any of examples 16 and 17, wherein a top surface of each of the teeth of the first half of the dog clutch and the second half of the dog clutch is sloped at an angle to promote movement of the plurality of teeth into a meshed, engaged position.

Example 19 includes the system of any of examples 16 through 18, wherein a side of each of the teeth of the plurality of teeth of the first half of the dog clutch and the second half of the dog clutch is sloped at an angle to promote movement of the plurality of teeth into a meshed, engaged position.

Example 20 includes the system of any of examples 15 through 19, and further comprising a proximity sensor that is configured to detect when the first half of the dog clutch engages with the second half of the dog clutch.

What is claimed is:

1. A method to reset an electromechanical disconnect, the method comprising:
electrically disengaging a pawl holding a first half of a dog clutch, located between a starter-generator and a main engine gear box, in a disengaged position;
controllably energizing the starter-generator to produce a selected angle of rotation of a starter-generator shaft, wherein the selected angle is equal to 360 degrees divided by a number of teeth on the first half of the dog clutch; and determining when the first half of the dog clutch is engaged with a second half of the dog clutch.

2. The method of claim 1, wherein electrically disengaging the pawl comprises sending an electrical signal to a solenoid that moves the pawl to enable translation of the first half of the dog clutch axially toward a second half of the dog clutch.

3. The method of claim 1, wherein controllably energizing the starter-generator comprises providing a start current with a ramp from 0 to 5% for up to two seconds to the starter-generator.

4. The method of claim 1, wherein controllably energizing the starter-generator comprises providing a start current in short, low bursts to cause the starter-generator shaft to rotate in small increments.

5. The method of claim 1, wherein controllably energizing the starter-generator comprises applying current at a level to cause the starter-generator shaft to rotate slowly.

6. The method of claim 1, wherein controllably energizing the starter-generator comprises pulsing the starter-generator for a period of time at high frequency to cause starter-generator shaft to rotate through the selected angle.

7. The method of claim 1, wherein the dog clutch has four teeth on the first half of the dog clutch and four teeth on the second half of the dog clutch, and the selected angle of rotation is 90 degrees.

8. A resettable electromechanical disconnect, comprising:
a dog clutch having a first half and a second half, the first half and second half of the dog clutch oriented along an axis, wherein the first half of the dog clutch is configured to engage with a shaft of a main gear box and the second half of the dog clutch is configured to engage with a drive shaft of a starter-generator;
a pawl positioned to move between a first position and a second position, wherein the pawl is disengaged from the dog clutch in the first position and the pawl engages with the second half of the dog clutch in the second position;
a solenoid coupled to the pawl; and
a control input configured to receive a control signal, wherein the control signal causes the solenoid to move the pawl between the first position and the second position;
wherein when the control input receives the control signal to move the pawl to the first position, the pawl disengages with the second half of the dog clutch, the second half of the dog clutch translates toward the first half of the dog clutch and the second half of the dog clutch is controllably rotated through a selected angle by a low torque from the starter-generator until the first half of the dog clutch engages with the second half of the dog clutch, wherein the selected angle is equal to 360 degrees divided by a number of teeth on each half of the dog clutch.

9. The resettable electromechanical disconnect of claim 8, wherein the second half of the dog clutch includes a spring in a shaft, wherein the spring applies a force on the second half of the dog clutch that causes the second half of the dog clutch to translate toward the first half of the dog clutch when the pawl is in the first position.

10. The resettable electromechanical disconnect of claim 8, wherein the first half of the dog clutch and the second half of the dog clutch include a plurality of teeth.

11. The resettable electromechanical disconnect of claim 10, wherein the teeth of the plurality of teeth are spaced apart to provide an opening between adjacent teeth in the plurality of teeth.

12. The resettable electromechanical disconnect of claim 10, wherein a top surface of each tooth of the plurality of teeth of the first half of the dog clutch and the second half of the dog clutch is sloped at an angle relative to a plane that is orthogonal to the axis to promote movement of the plurality of teeth into a meshed, engaged position.

13. The resettable electromechanical disconnect of claim 10, wherein a side of each tooth of the plurality of teeth of the first half of the dog clutch and the second half of the dog clutch is sloped at an angle relative to an opposite side of the respective tooth to promote movement of the plurality of teeth into a meshed, engaged position.

14. The resettable electromechanical disconnect of claim 8, further comprising a proximity sensor that is configured to detect when the first half of the dog clutch engages with the second half of the dog clutch.

15. A system, comprising:
a starter-generator;
a main engine gear box;
a resettable electro-mechanical disconnect coupled between the starter-generator and the main engine gear box;
a controller, coupled to the starter-generator and the resettable electro-mechanical disconnect; and
the resettable electro-mechanical disconnect including:
a dog clutch having a first half and a second half, the first half and second half of the dog clutch oriented along an axis, wherein the first half of the dog clutch is configured to engage with a shaft of the main gear box and the second half of the dog clutch is configured to engage with a drive shaft of the starter-generator;
a pawl positioned to move between a first position and a second position, wherein the pawl is disengaged from the dog clutch in the first position and the pawl engages with the second half of the dog clutch in the second position;
a solenoid coupled to the pawl; and
a control input configured to receive a control signal from the controller, wherein the control signal causes the solenoid to move the pawl between the first position and the second position;
wherein when the control input receives the control signal from the controller to move the pawl to the first position, the pawl disengages with the second half of the dog clutch, the second half of the dog clutch translates toward the first half of the dog clutch and the second half of the dog clutch is controllably rotated through a selected angle by a low torque from the starter-generator until the first half of the dog clutch engages with the second half of the dog clutch, wherein the selected angle is equal to 360 degrees divided by a number of teeth of a plurality of teeth on each half of the dog clutch.

16. The system of claim 15, wherein the second half of the dog clutch includes a spring in a shaft, wherein the spring applies a force on the second half of the dog clutch that causes the second half of the dog clutch to translate toward the first half of the dog clutch when the pawl is in the first position.

17. The system of claim 16, wherein the teeth of the plurality of teeth are spaced apart to provide an opening between adjacent teeth in the plurality of teeth.

18. The system of claim 16, wherein a top surface of each of the teeth of the first half of the dog clutch and the second half of the dog clutch is sloped at an angle to promote movement of the plurality of teeth into a meshed, engaged position.

19. The system of claim 16, wherein a side of each of the teeth of the plurality of teeth of the first half of the dog clutch and the second half of the dog clutch is sloped at an angle to promote movement of the plurality of teeth into a meshed, engaged position.

20. The system of claim 15, further comprising a proximity sensor that is configured to detect when the first half of the dog clutch engages with the second half of the dog clutch.

\* \* \* \* \*